3,482,733
STRIP PACKAGE
Robert C. Groves, 1800 Southwood Lane W.,
Dayton, Ohio
Filed Oct. 1, 1965, Ser. No. 492,130
Int. Cl. B65d *83/06;* G07f *11/66*
U.S. Cl. 221—25                                    6 Claims

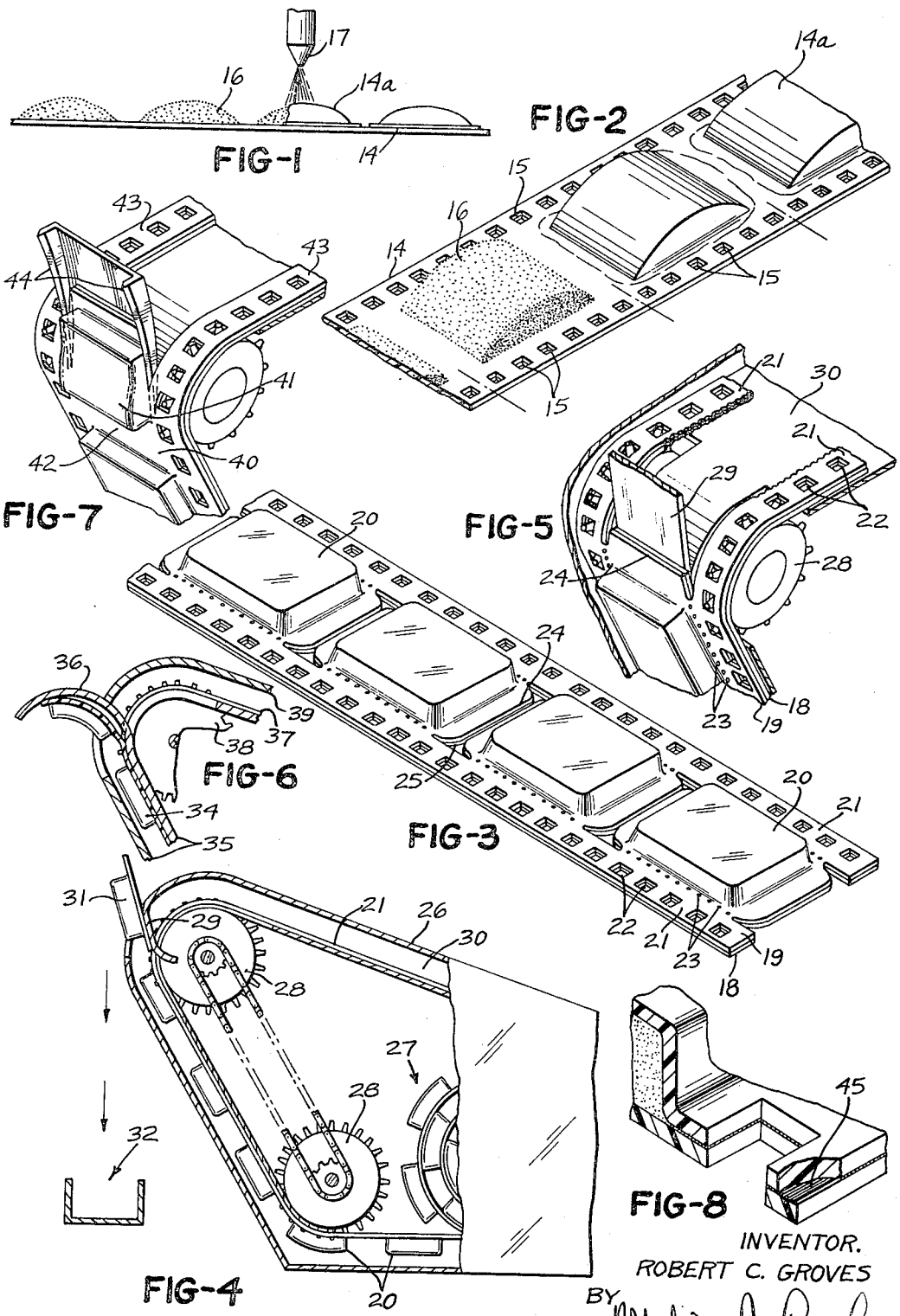

ABSTRACT OF THE DISCLOSURE

A flexible carrier strip and a cover strip are sealed together to define longitudinally spaced hermetically sealed compartments, and the edge portions of the strips have longitudinally spaced feed holes for engaging a pin drive. Longitudinally spaced perforations extend within the edge portions between the compartments and the feed holes, and incisions extend laterally between the compartments from one line of perforations to the other and cooperate with the perforations to define longitudinally spaced packets each having a hermetically sealed compartment. The packets are successively separated from the edge portions of the strips by pulling the edge portions past a member extending between the edge portions.

---

This invention relates to packaging of articles and materials and the handling and feeding thereof, and to the packaging and handling of materials in such a manner as to facilitate the delivery thereof to a selected point in predetermined quantities.

The packaging and dispensing of materials and articles either in automatic machines, such as washing machines or the like, or in coin-operated dispensers, has become an endeavor of substantial size, and a great many articles and materials are now automatically dispensed in measured quantities.

It is in particular connection with the packaging of articles and materials that the present invention is concerned.

A primary object of this invention is an improved method of packaging articles and materials such that the handling thereof is more convenient and accurately defined than has heretofore been the case.

Another object of this invention is the provision of an improved package for articles and materials which readily adapts itself to the conveying of materials in automatic packaging devices, coin-operated mechanisms, and the like.

Still another object of this invention is the provision of a novel package arrangement for articles or materials in which the articles or materials are at all times completely protected against certain external influences until it is desired to utilize said articles or materials.

Still another object of this invention is the provision of an improved packaging arrangement in which the conveying or indexing of the articles or packaged material can be made extremely precise, but, at the same time, quite convenient.

It is the particular object of this invention to provide a method of strip packaging and a strip package for individual articles and bulk materials which is greatly improved over previous packaging methods and packages.

It is still another object of this invention to provide a strip package for individual articles or bulk material in which each article or each unit quantity of the material is individually and totally enclosed and which strip includes an arrangement for the precise conveying thereof to determine exactly the number of articles or the quantity of material carried by the strip package that is conveyed in any given cycle.

The foregoing objects and advantages of the present invention will become more apparent upon reference to the following specification taken in connection with the accompanying drawings, wherein:

FIGURE 1 is a rather diagrammatic view showing the formation of a packaging arrangement according to my invention;

FIGURE 2 is a perspective view of the strip package of FIGURE 1;

FIGURE 3 is a perspective view of still another strip package according to my invention;

FIGURE 4 is a vertical sectional view showing rather diagrammatically an arrangement for handling the strip package of FIGURE 3;

FIGURE 5 is a perspective view showing a portion of the mechanism of FIGURE 4 and showing in particular the mechanism by which the individual packages are separated from the edges of the strip package;

FIGURE 6 is a view similar to FIGURE 4 but illustrating a somewhat modified arrangement for discharging the package as it is removed from the carrier strip;

FIGURE 7 is a perspective view similar to FIGURE 5 but showing how cutting blades could be employed for cutting the individual packages from the carrier strip instead of tearing them therefrom; and FIGURE 8 is a fragmentary sectional view through the carrier strip.

GENERAL ARRANGEMENT

In general, the several objects of the present invention are attained by distributing individual articles or bulk material along a strip which may be referred to as a carrier strip and hermetically sealing the individual articles to the strip or hermetically sealing the bulk material in discrete quantities to the strip, the said articles or the said discrete quantities of material being in uniformly distributed relation along the carrier strip.

The carrier strip embodies feed holes uniformly distributed along one or both edges thereof which are employed for feeding the carrier strip and, therefore, advancing the articles or material thereon. The feed holes bear a predetermined relation to the distribution of the articles or material on the carrier strip and the number of articles or the number of discrete quantities of material on the carrier strip conveyed by a predetermined movement of a driving member engaging the drive holes can thus be determined precisely.

The carrier strip embodies feed holes uniformly distributed along one or both edges thereof which are employed for accurately indexing the position of the carrier strip and, therefore, advancing the articles or material thereon in a timed relationship with said feed holes. The feed holes bear a predetermined lineal and incremental ratio to the distribution of the conveyed materials and the carrier strip proper and the number of articles, materials, or the number of discrete quantities of materials thus confluently conveyed by the carrier strip fed by an accurately predetermined movement of a driving mechanism engaging the drive holes can thus be precisely determined.

In one form of the invention, the articles or materials are carried on a carrier strip in uniformly distributed relation and a covering strip is applied thereto and sealed to the carrier strip about the articles or discrete quantities of material carried thereon.

In another modification, the two strips, namely the carrier strip and the cover strip, are substantially identical and are pre-formed so as to have pockets therein so as to retain the articles or quantities of material therein when the carrier strip and cover strip are brought together and sealed about the pre-formed pockets therein.

In still another modification, the articles are distributed along the carrier strip, or the materials to be carried thereby are formed into discrete quantities therealong or are placed on the strip in pelletized form and the cover strip is applied thereto in the form of a wet film as by spraying so that, when the film dries, or is dried, the materials will be hermetically sealed to the carrier strip.

In still another modification, the carrier strip and cover strip forming the hermetically sealed compartments for articles or material have feed holes formed along both edges, said edge portions being connected to the compartments along lines of separation. The individual compartments are separated from each other by lateral incisions extending between the lines of perforation so that, by tearing or cutting off the edge portions along the said lines of separation, the individual compartments will fall free of the strip.

STRUCTURAL ARRANGEMENT

Referring to the drawings more in detail, FIGURES 1 and 2 illustrate an arrangement wherein there is a carrier strip 14 having associated therewith cover means 14a that defines with the carrier strip a plurality of individual compartments adapted for receiving individual articles or bulk material.

The individual compartments are sealed about their entire periphery by sealing the cover means, which may be a strip, to the carrier strip either by adhesive or by known heat sealing techniques. The particular manner in which this is accomplished will depend upon the particular material being employed. With the carrier strip and cover strip made of Pliofilm, for example, heat sealing of the strips together would produce hermetically sealed compartments. In other cases, utilizing a wax paper, for example, a heat sealing technique could also be employed whereas, with certain plastic materials, such as cellulose acetate, it would be preferable to employ an adhesive. Also, heat and water sealing of a water soluble film could be employed. Further, in some cases, the cover sheet could be stitched in place and sealing accomplished by this operation or by the use of adhesive or heat or by a solvent type cementing agent. The solvent type cementing agent could also be employed instead of adhesive in certain cases.

At least one marginal portion of the carrier and cover strip combination is sufficiently wide to receive therein in uniformly distributed relation feed holes which can be utilized to control the feeding and locating of the strip. A pin wheel or suitably constructed sprocket for example, could be connected with the feed holes to drive a strip pacskage. The amount of rotation of such a driving member could, of course, be extremely closely controlled and thus, in turn, precisely control the conveying movement of the strip package.

In FIGURES 1 and 2, there is shown a carrier strip 14 having feed holes 15 along at least one edge thereof and with the carrier strip being adapted for receiving in uniformly spaced relation therealong articles or pellets 16 of material to be carried by the strip package. In this modification, the cover strip is applied in the form of a wet film as by spraying the cover material on the carrier strip from the nozzle 17.

FIGURE 4 illustrates ejection of the pouches or compartments as a continuous repetitive operation as opposed to an intermittent or sporadic delivery, and to a method of detaching or separating individual portion compartments or pouches from the remainder of the strip. This operation could be performed immediately upon completion of a packaging procedure and, further, provides that the films are pulled and not pushed thereby enabling operation at higher speeds and permitting lighter weight films to be processed by this method.

In FIGURES 3 and 4, there is the usual combination of a carrier strip 18 and a cover strip 19 sealed thereto so as to form individual hermetically sealed compartments 20. The strip package has relatively wide edge portions 21 in which are located the uniformly spaced feed holes 22. The edge portions 21 are also provided with lines of perforations 23 which are formed in the sealed-together edge portions so as not to destroy the hermetically sealed condition of the individual compartments 20.

Extending laterally across the strip package between the individual compartments are the incisions 24 having somewhat enlarged end portions 25 that coincide with the lines of perforations. The provision of the incisions 24 with their enlarged end portions 25 reduces the area that must be sealed together and an economy in the sealing is thus effected. Furthermore, the lateral incisions make it simple to remove the individual packets from the strip package merely by tearing the edge portions 21 therefrom along the lines of perforation 23.

This can be done in a device such as is illustrated in FIGURES 4 and 5 wherein there is provided a housing 26 in which a strip package 27 according to FIGURE 3 is placed. This strip package is fed by the rotary pin wheels or feed members 28 upwardly in the housing and past a tear-off blade 29 which engages the back of the strip package in between the lines of perforation and tears the individual packets from the edge portions 21 of the strip package. The edge portions are fed on through a discharge chute 30 while the individual torn-off packets, one of which is indicated at 31 in FIGURE 4, drop outside the housing to a point of use 32, which may be a washing machine tub, or the like.

It is contemplated, particularly where the packets are to be delivered to a washing machine tub, to form the carrier strip and cover strip from a material which is water soluble and which may be beneficial to the washing bath. Polyvinyl alcohol, for example, is water soluble and a wetting agent, and can be formed into strips from which to form the strip package.

While polyvinyl alcohol is soluble in water and is also a wetting agent, other film materials could be employed which were merely water soluble and had no wetting agent properties and, in other cases, where the receiving bath was other than water, the film could suitably be a material which was soluble therein but not necessarily soluble in water.

It is also contemplated to employ the principles of the present invention in connection with the packaging of materials in individual packets, in which case the carrier strip having the feed holes along at least one edge, following the delivery of the materials to be packaged thereto and the sealing of the material into compartments, is passed through a mechanism similar to that shown in FIGURE 4, wherein the perforated portion of the carrier strip is removed therefrom. The carrier strip is either automatically separated into individual packets by this operation, or is thereafter cut apart between the individual packets, thereby producing a plurality of individual sealed packages containing the desired quantities of the packaged material. In an operation of this nature, it will be apparent that the feed holes along the edge or edges of the carrier strip provide the means for advancing the carrier strip at the proper rate of speed and for synchronizing the strip with the delivery of the material thereto and with the mechanism for severing the carrier strip into the individual packages referred to.

In the modification of FIGURE 7, the carrier strip 40 has the individual compartments 41 therein separated from each other by the lateral incisions 42, but there is no line of perforations between the individual compartments or packages and the perforated edge portions 43 of the carrier strip. Instead, the discharging mechanism includes cutting blades 44 that cut off the individual compartments in the manner illustrated so that they discharge from the carrier strip.

It is contemplated to move the carrier strip in the FIGURES 4 through 7 modifications at sigh speed and, with this in mind, it may be desirable to reinforce the edge portions, as indicated at 45 in FIGURE 8, by filaments, or the like, such as glass fibers, extending longitudinally along the said edge portions. This will serve to prevent the edge portions from breaking and will thus permit quick starting of the carrier strip and rapid movement thereof. This might be desirable in connection with high speed assembling operations where a plurality of different components were brought together by discharging the components from various stations disposed along a conveyor to a receiving station moving along the conveyor past the several discharge stations.

While the packages herein described constitute preferred embodiments of the invention, it is to be understood that the invention is not limited to these precise packages, and that changes may be made therein without departing from the scope and spirit of the invention.

What is claimed is:

1. A strip package comprising a carrier strip and a cover strip sealed thereto and said strips defining therebetween hermetically sealed compartments spaced uniformly along the sealed together strips, said sealed together strips having marginal edge portions extending laterally outwardly from said compartments and having feed holes formed therein, lines of perforations extending along said edge portions between the said feed holes and the said compartments, and incisions extending laterally of the strip between the compartments from one line of perforations to the other whereby the individual compartments can be torn out from between the said edge portions, each of said incisions having an enlarged end portion at each end coinciding with the lines of perforations.

2. The combination of a strip package including a carrier strip and a cover strip sealed together to define longitudinally spaced hermetically sealed compartments, said sealed together strips having laterally projecting edge portions, lines of longitudinally spaced perforations within said edge portions adjacent said compartments, incisions extending laterally between the compartments from one said line of perforations to the other said line and cooperating with said perforations to define longitudinally spaced packets each having one of said compartments, strip advancing means for engaging said edge portions, and means extending between said lines of perforations for successively separating each said packet from said edge portions in response to advancement of said strips.

3. The combination as defined in claim 2 wherein said carrier strip and said cover strip comprises liquid soluble strips.

4. A strip package comprising a flexible carrier strip, cover means attached to said carrier strip and cooperating therewith to define a plurality of longitudinally spaced compartments and marginal edge portions projecting laterally outwardly from said compartments, means defining longitudinally extending lines of spaced perforations within said marginal edge portions on opposite sides of said compartments, incision means extending between adjacent said compartments only from one said line of perforations to the other said line and arranged to define a longitudinally projecting generally U-shaped tab between said lines of perforations for each said compartment, and said incision means cooperating with said perforations to define a plurality of longitudinally spaced packets each having at least one compartment and one of said tabs to provide convenient and dependable separation of each said packet from said carrier strip in response to pulling said edge portions past a member extending between said edge portions.

5. A strip package adapted for use in an automatic dispenser, comprising a flexible carrier strip, a cover strip sealed to said carrier stip and cooperating therewith to define longitudinally spaced hermetically sealed compartments, said sealed together strips having marginal edge portions extending laterally outwardly from said compartments, means defining longitudinally spaced feed holes within said edge portions, means defining lines of longitudinally spaced perforations within said edge portions between each said compartment and said feed holes, means defining incisions extending laterally between said compartments only from one said line of perforations to the other said line, said incisions and said perforations cooperating to define longitudinally spaced packets each having at least one of said hermetically sealed compartments and with adjacent said packets being completely separated from one said line of perforations to the other said line by one of said incisions to effect separation of each said packet from said strip in response to pulling said edge portions past a member extending between said edge portions and without the use of cutting knives.

6. A strip package as defined in claim 5 wherein said carrier strip and said cover strip comprise liquid soluble strips.

References Cited

UNITED STATES PATENTS

| 3,394,798 | 7/1968 | Sako | 206—56 |
| 943,652 | 12/1909 | Coe et al. | 206—56 |
| 1,637,891 | 8/1927 | Bates | 206—56 |
| 2,180,966 | 11/1939 | Salfisberg | 206—56 |
| 3,140,816 | 7/1964 | Schultz | 229—69 |
| 2,636,008 | 4/1953 | Jurgensen et al.. | |
| 3,039,246 | 6/1962 | David | 206—56 |
| 3,047,347 | 7/1962 | Groves. | |
| 3,380,578 | 4/1968 | Sparks | 206—56 |

FOREIGN PATENTS

| 674,635 | 11/1963 | Canada. |
| 1,123,626 | 6/1956 | France. |
| 786,188 | 11/1957 | Great Britain. |

MARTHA L. RICE, Primary Examiner

U.S. Cl. X.R.

206—56